(12) United States Patent
Richer, Sr.

(10) Patent No.: US 8,308,416 B2
(45) Date of Patent: Nov. 13, 2012

(54) TRANSPORTER FOR RIDE-ON POWER TROWEL

(76) Inventor: Scott A. Richer, Sr., Sanford, ME (US)

( * ) Notice: Subject to any disclaimer, the term of this patent is extended or adjusted under 35 U.S.C. 154(b) by 332 days.

(21) Appl. No.: 12/392,707

(22) Filed: Feb. 25, 2009

(65) Prior Publication Data

US 2009/0202329 A1    Aug. 13, 2009

Related U.S. Application Data

(63) Continuation-in-part of application No. 11/114,586, filed on Apr. 26, 2005, now abandoned.

(60) Provisional application No. 61/067,143, filed on Feb. 26, 2008.

(51) Int. Cl.
*B60P 3/06* (2006.01)

(52) U.S. Cl. .................... 414/459; 414/461

(58) Field of Classification Search ........... 414/458–461
See application file for complete search history.

(56) References Cited

U.S. PATENT DOCUMENTS

| | | | |
|---|---|---|---|
| 2,316,938 A | 4/1943 | Dimick | |
| 2,603,369 A | 7/1952 | Soderstrom | |
| 2,699,874 A | 1/1955 | Bernaerts | |
| 2,902,183 A | 9/1959 | Dodge | |
| 2,980,193 A | 4/1961 | Baudhuin et al. | |
| 3,348,712 A | 10/1967 | Hanson | |
| 3,396,861 A | 8/1968 | Houlton | |
| 3,482,720 A * | 12/1969 | Tax et al. | 414/460 |
| 3,998,432 A | 12/1976 | Uldricks et al. | |
| 3,999,672 A * | 12/1976 | Brock | 414/461 |
| 4,016,993 A | 4/1977 | Tax et al. | |
| 4,143,781 A | 3/1979 | Lenius et al. | |
| 4,236,859 A * | 12/1980 | Stearn et al. | 414/460 |
| 4,378,072 A | 3/1983 | Appleman et al. | |
| 4,551,059 A | 11/1985 | Petoia | |
| 2005/0019142 A1 * | 1/2005 | Miles et al. | 414/460 |
| 2006/0239807 A1 | 10/2006 | Richer, Sr. | |

* cited by examiner

*Primary Examiner* — Saul Rodriguez
*Assistant Examiner* — Jonathan Snelting
(74) *Attorney, Agent, or Firm* — Preti Flaherty Beliveau & Pachios LLP

(57) ABSTRACT

A vehicle for transporting a ride-on trowel includes a vehicle frame forming a bay sized to receive the ride-on trowel and a system for supporting the ride-on trowel from the vehicle frame. The vehicle frame includes a lower frame that surrounds the bay on three sides. The lower frame has an open rear end and a tapered front end and is configured to closely match the shape of the ride-on trowel outer frame.

14 Claims, 8 Drawing Sheets

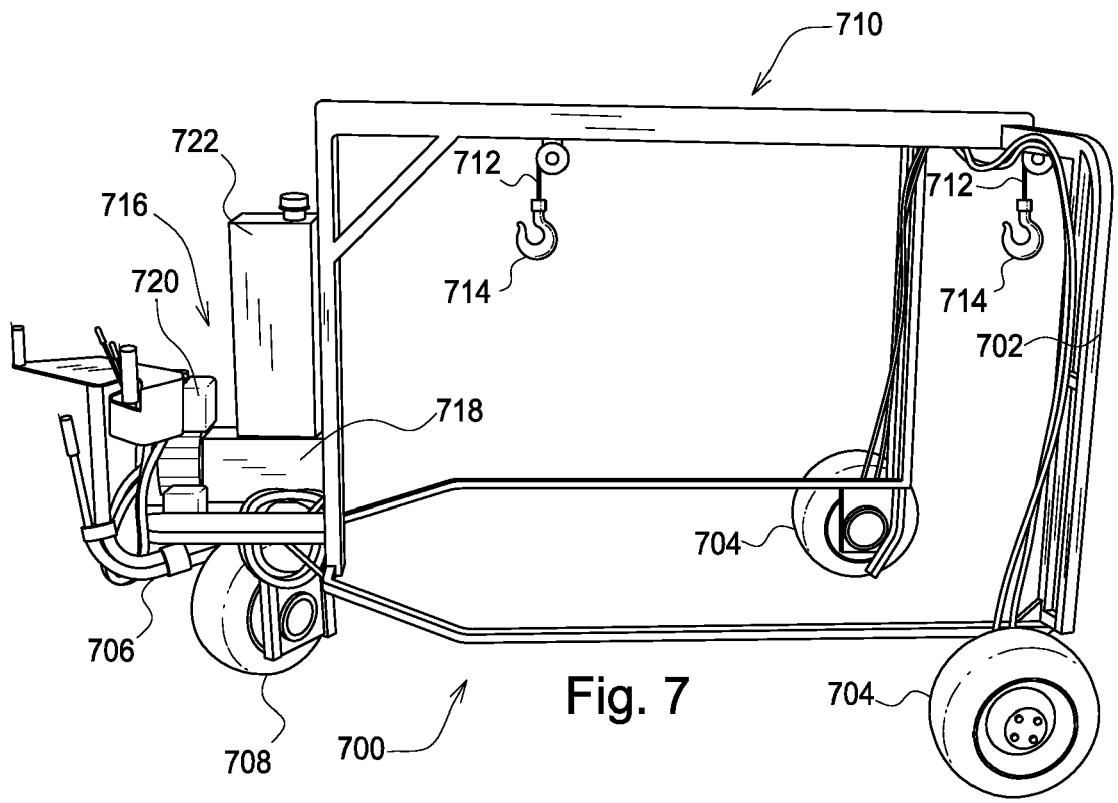
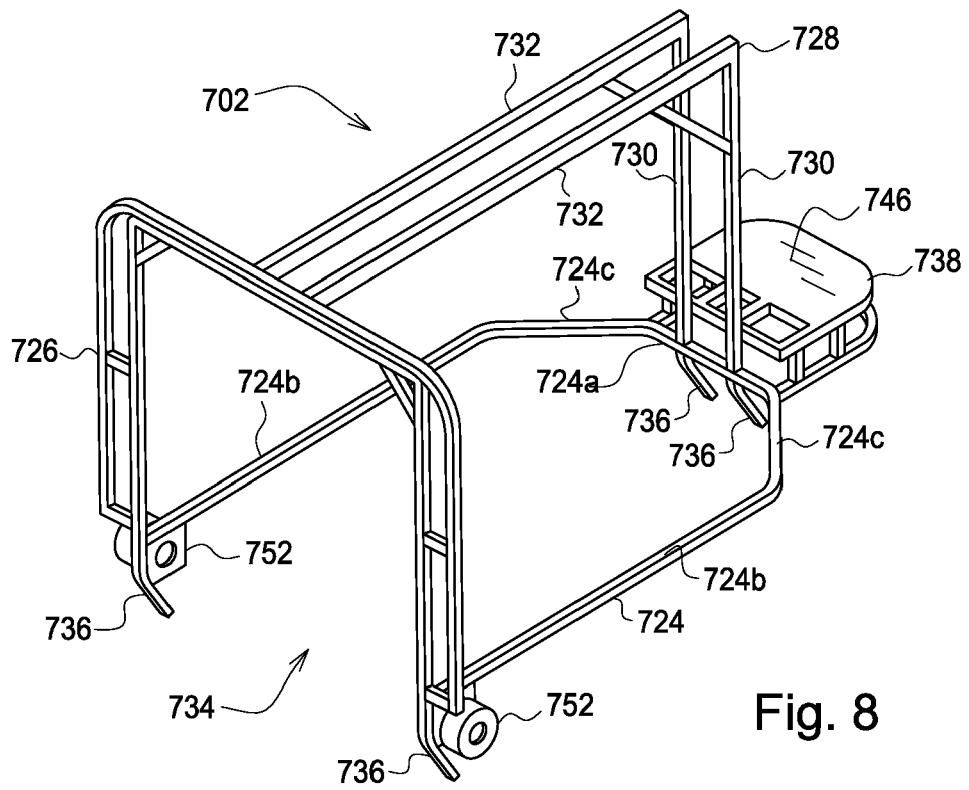

TRANSPORTER FOR RIDE-ON POWER TROWEL

CROSS REFERENCES TO RELATED APPLICATIONS

This application is a Continuation-In-Part of U.S. patent application Ser. No. 11/114,586, filed Apr. 26, 2005. This application also claims the benefit of U.S. Provisional Application No. 61/067,143, filed Feb. 26, 2008 and hereby incorporated by reference.

BACKGROUND OF THE INVENTION

1. Field of the Invention

The invention relates to the field of transporters. More particularly, the invention relates to a transporter for industrial ride-on power trowels used for surface treatment of concrete floors.

2. Description of the Prior Art

Many large facilities, such as buildings for expositions or trade-shows, "big-box" retail stores, warehouses, etc., have concrete floors. After the concrete has been poured and set, the floor is troweled to achieve a smooth surface. The trowel was initially a powered trowel that the operator walked beside as it moved across the concrete surface, similar to the operation of a lawnmower. The size of the pours has increased greatly in recent years and ride-on trowels have been developed to make it easier to trowel such large areas. These ride-on trowels are large, extremely heavy power machines. Not only does the trowel have very heavy gear for grinding the concrete surface to a smooth finish, but it also is equipped with the drive means and a seat for the operator, who rides on the trowel and guides it across the floor. One example of such ride-on trowels is the HYDROSTATIC STX-55J-6 by Whiteman, which has a footprint of 125×65 inches, is 57 inches high, and weighs 2,270 lbs. Even the smallest of the ride-on power trowels has a footprint of 71×39 inches and weighs 440 lbs.

It is very difficult to move these ride-on trowels from one location to another. Lifting units, such as hydraulically, mechanically, or electrically powered hand trucks, are typically used to lift the ride-on trowel above the ground surface. For example, two lifting units are coupled with lifting points provided on the ride-on trowel, are then actuated to lift the ride-on trowel several inches above ground. Once lifted above ground, two to six persons, depending on the size of the ride-on trowel, now push the ride-on trowel along the ground or up or down a loading ramp. The process is time-consuming and potentially very hazardous, as the risks are great of losing control over the ride-on trowel and, as a result, suffering injury to personnel and/or economic loss due to damage to the trowel or other equipment. The task of pushing a ride-on trowel across a soft ground surface, such as sand, with the lifting units is almost impossible. In that case, a powered hoist means must be employed to lift the ride-on trowel above ground.

What is needed therefore is a transportation means for quickly and safely transporting a ride-on trowel. What is further needed is such a means that lifts the ride-on trowel above the ground surface and moves it to another location.

SUMMARY OF THE INVENTION

The problem of maneuvering and transporting the ride-on trowel is solved by providing a trowel transporter that lifts and transports the ride-on trowel, safely, and without danger of injuring personnel or damaging the ride-on trowel itself. In one embodiment, the trowel transporter is a wheeled vehicle comprising a hydraulic lift system for lifting and lowering the ride-on trowel, a frame for securing the ride-on trowel above ground, and drive means for moving the trowel transporter across a ground surface.

The frame is a rugged steel vehicle frame that forms a receiving bay for receiving the ride-on trowel. A drive system with wheels and a brake provides the trowel transporter with mobility and maneuverability. The hydraulic lift system and the drive system are powered by a hydraulic power plant that includes conventional hydraulic components, such as a fluid reservoir, hydraulic fluid lines, valves and controls, a hydraulic pump unit, and an engine for driving the pump unit.

The hydraulic lift system includes a hydraulic piston-and-cylinder unit that is assembled on the frame. Attachment means are provided on the frame for coupling the frame with lifting points on the ride-on trowel. The attachment means may include lifting pins or studs mounted on a movable or slidable bracket. The lifting studs are insertable into lifting points that are bores provided on the lower portion of the ride-on trowel. Once attached, the ride-on trowel is lifted above the ground surface by the piston-and-cylinder unit. This is done, for example, by hydraulically lifting the bracket or portion of the frame to which the lifting studs are attached. It is also possible to provide hooks and cables as an attachment means. The cables are suspended from an upper portion of the frame. The hooks are attachable to lifting points that are eye bolts provided on readily accessible areas of the ride-on trowel. The hook ends of the cables are lifted or lowered by the hydraulic lift system.

To move a ride-on trowel, the trowel transporter is driven into an operating position, in which the ride-on trowel is received into the receiving bay. The attachment means are attached to the lifting points on the ride-on trowel. It may be desirable to provide buffers or other securing means between the ride-on trowel and the frame to prevent damage to the ride-on trowel or the trowel transporter during transportation. Once the ride-on trowel is lifted and secured within the trowel transporter, the trowel transporter with ride-on trowel may be driven to a new location. In addition, the trowel transporter and ride-on trowel may be driven onto another means of transportation, such as a flatbed trailer, a closed trailer, or the like, for transporting the trowel transporter and ride-on trowel to a different location.

The scope of the invention includes various configurations of the drive system. Often, the trowel transporter will be used to transport the ride-on trowel a short distance, from one area of a construction site to another, or onto or off of a loading ramp. For such purposes, a three-wheeled drive system provides the necessary stability and mobility, and is economical. A drive wheel is provided at a first end of the frame and two follower wheels at a second end of the frame. The drive wheel is provided with steering linkage and a brake. It is, of course, within the scope of the invention to provide a four-wheeled trowel transporter. It is also within the scope of the invention to provide various ways of providing operator control of the trowel transporter. For example, in a simple configuration, a steering bar with a brake control is linked to the drive wheel. To operate the trowel transporter, the operator starts the drive motor, grasps the steering bar and walks alongside the trowel transporter, steering the drive wheel by moving the steering bar to the right or left. It is, however, within the scope of the invention to incorporate an operator seat and control panel within the vehicle frame, to enable the operator to be seated while driving the trowel transporter.

DESCRIPTION OF THE DRAWINGS

FIG. 7 is a perspective view of another embodiment of a trowel transporter.

FIG. 8 is a perspective view of a vehicle frame for the trowel transporter of FIG. 7.

DETAILED DESCRIPTION OF THE INVENTION

Figure 1:
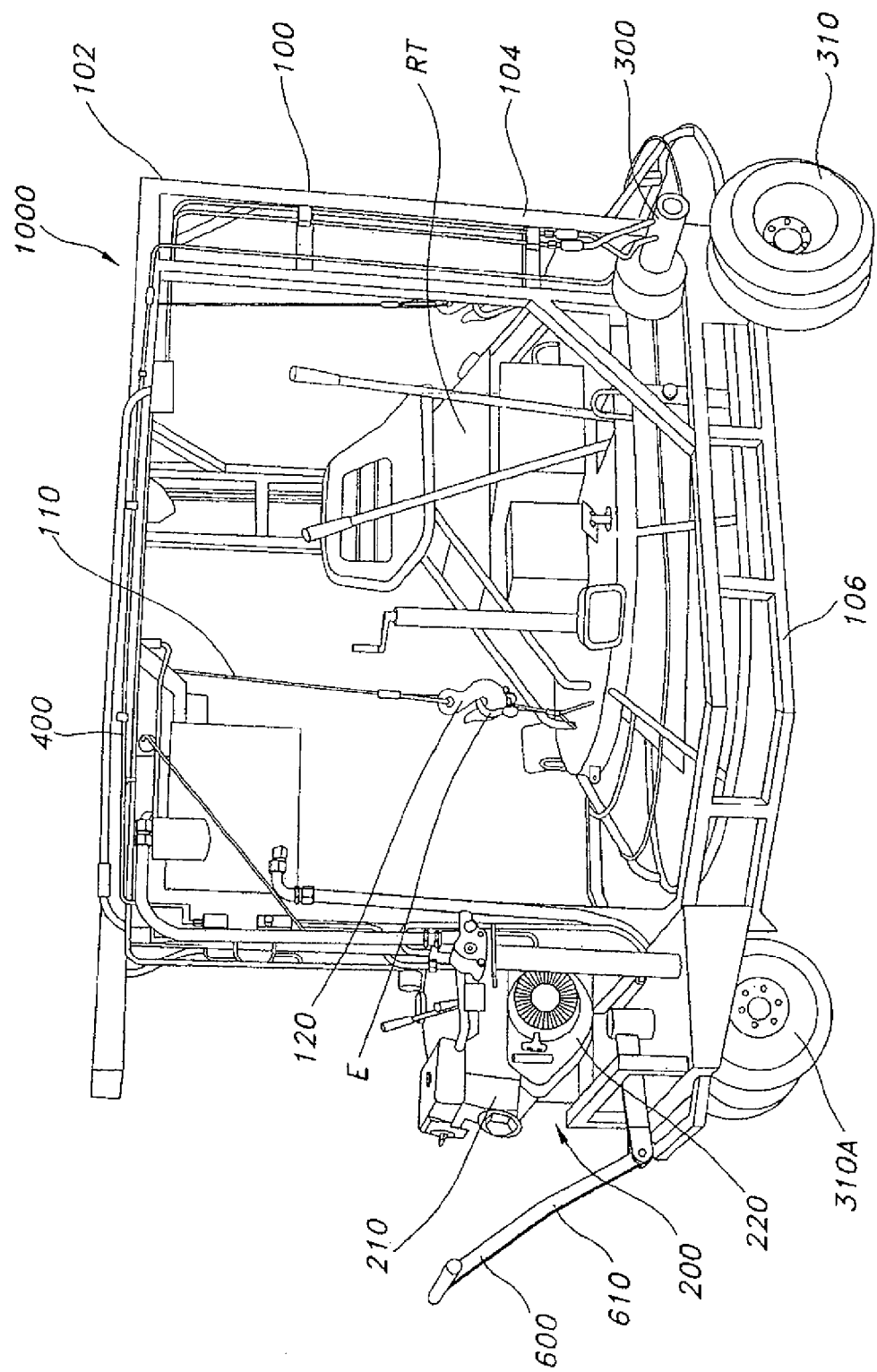
FIG. 1 is a perspective view of the trowel transporter according to the invention, showing the ride-on trowel lifted above ground with a first embodiment of the lifting means, and secured within the frame of the trowel transporter.

FIG. 1 is a perspective view of the trowel transporter 1000 according to the invention for transporting a ride-on trowel RT. The trowel transporter 1000 has a vehicle frame 100 with a receiving bay 109, a power plant 200, a hydraulic lift system 400 (shown with greater detail in FIGS. 3 and 4), wheel drive means 300, and a steering unit 600. As shown here, the ride-on trowel RT is supported in the bay 109 on lifting means 110 and attachment means 120 that depend from the vehicle frame 100. The ride-on trowel RT is a commercially available machine that comes in various sizes. The bay 109 is sized to receive the ride-on trowel RT; that is, the bay 109 is large enough so that at least one type of the various commercially available ride-on trowels will fit therein. The power plant 200 includes a hydraulic system with a reservoir of hydraulic fluid, valves, and controls, a hydraulic pump 220, and an engine 210 that powers the hydraulic pump 220. The hydraulic lift system 400 includes a piston-and-cylinder unit 420 that is mounted in the vehicle frame 100 and is actuated by the hydraulic pump 220 to raise and lower the lifting means 110. The wheel drive means 300 includes a drive motor 320 and wheels 310, at least one of which is a drive wheel 310A. Each drive wheel 310A, if there is more than one, is driven by its own drive motor 320. In the preferred embodiment of the trowel transporter 1000, the drive motor 320 drives a chain and sprocket mechanism 330, which, in turn, drives the drive wheel 310A. A hydraulic brake 340 is provided on at least one drive wheel 310A. The steering unit 600 for steering the trowel transporter 1000 is provided at one end of the frame 100 and includes a steering bar 610 with steering linkage linked to one of the drive wheels 310A.

The engine 210, the hydraulic pump 220, the drive motor 320, the chain-and-sprocket mechanism 330, the steering unit 600, and the brake 340 are conventional assemblies, well-known in the art, and are not described in greater detail herein. The following examples of suitable assemblies are provided for illustration purposes only and it is understood that the scope of the invention is not limited to any particular make, model or size of these assemblies. The drive motor 320 is a hydraulic general purpose Char-Lynn®Orbit® motor from the Eaton Corp. In this embodiment, the engine 210 is a GX 240-390 series gasoline engine from the Honda Motor Co., Ltd. The pump 220 is a hydraulic GC Series pump from Haldex, rated at 8 GPM at 3600 RPM. The chain-and-sprocket mechanism 330 is available from any automotive parts store, and the brake 340 is a hydraulic MICO disc brake. The drive motor 320 and the brake 340 are powered by the hydraulic power means 200.

Figure 2:
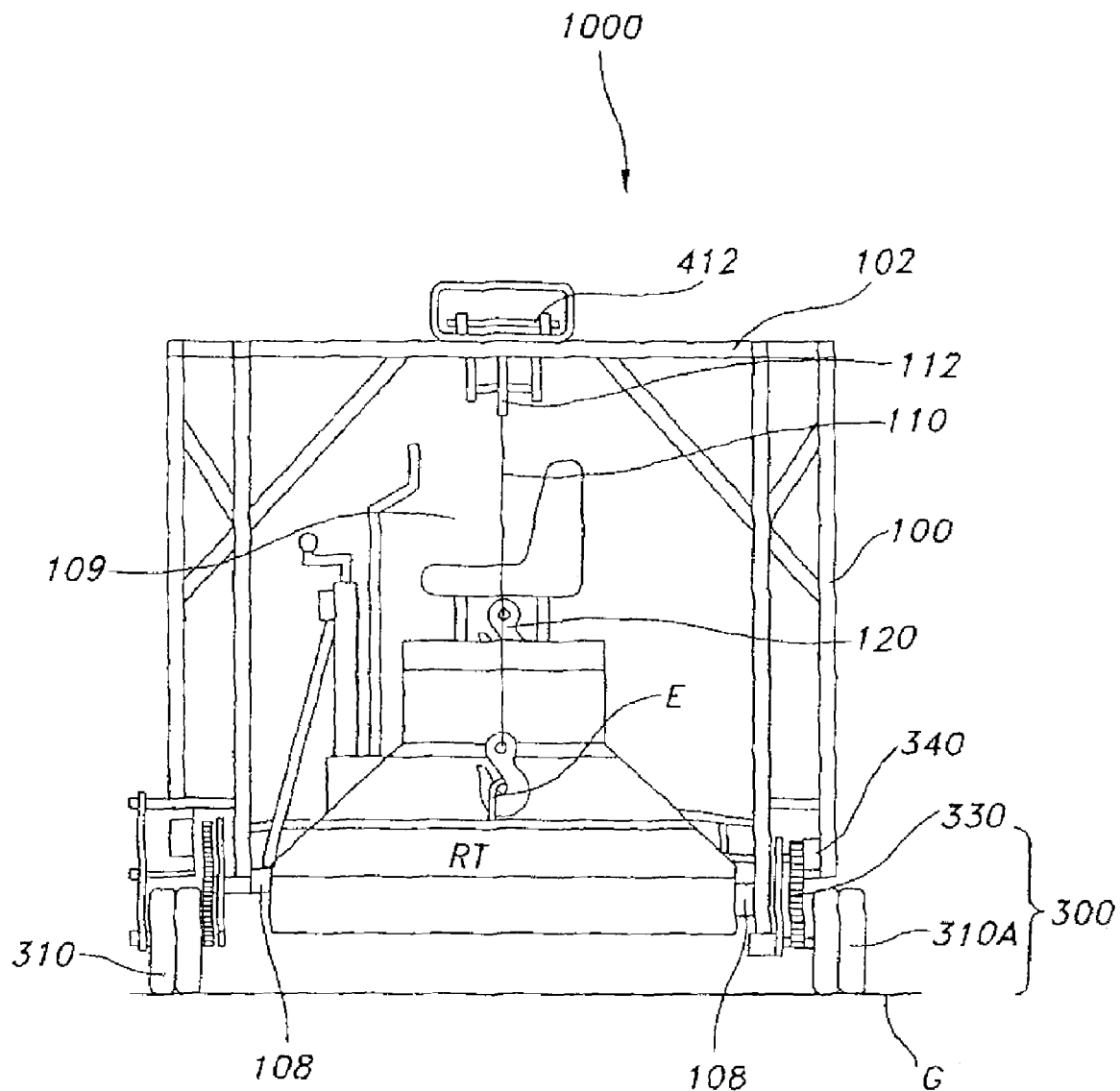
FIG. 2 is an elevational view of the open end of the trowel transporter of FIG. 1.

FIG. 2 is an elevational view of the trowel transporter 1000, showing the ride-on trowel RT captured within the trowel transporter 1000. The vehicle frame 100 comprises an upper frame 102, a lower frame 106, and vertical supports 104. As seen in FIG. 2, the lower frame 106 does not extend across the rear end of the vehicle frame 100, leaving the receiving bay 109 open for receiving the ride-on trowel RT. The trowel transporter 1000 is thus maneuverable into an operational position, in which the upper frame 102 is positioned above the ride-on trowel RT and the lower frame 106 surrounds it on three sides. Securing means 108 are attached to the ride-on trowel RT to keep it from swinging and hitting the trowel transporter 1000 during transportation. The securing means 108 may be tug straps or buffer members or other suitable securing devices that will prevent the ride-on trowel RT from swinging and hitting the trowel transporter.

Figure 3:
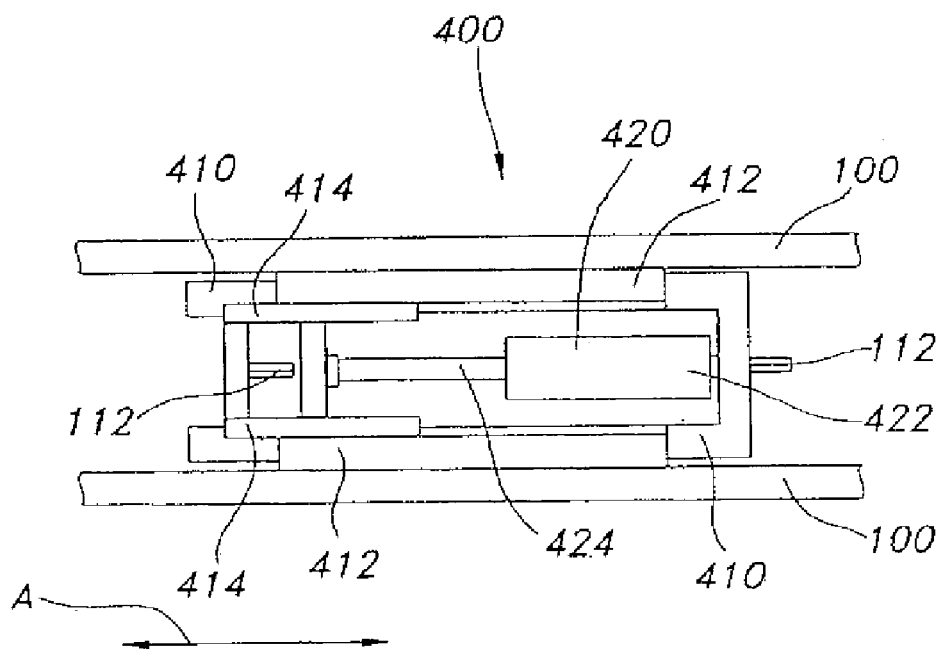
FIG. 3 is a plane view of the top of the vehicle frame, showing the hydraulic lifting means.
Figure 4:
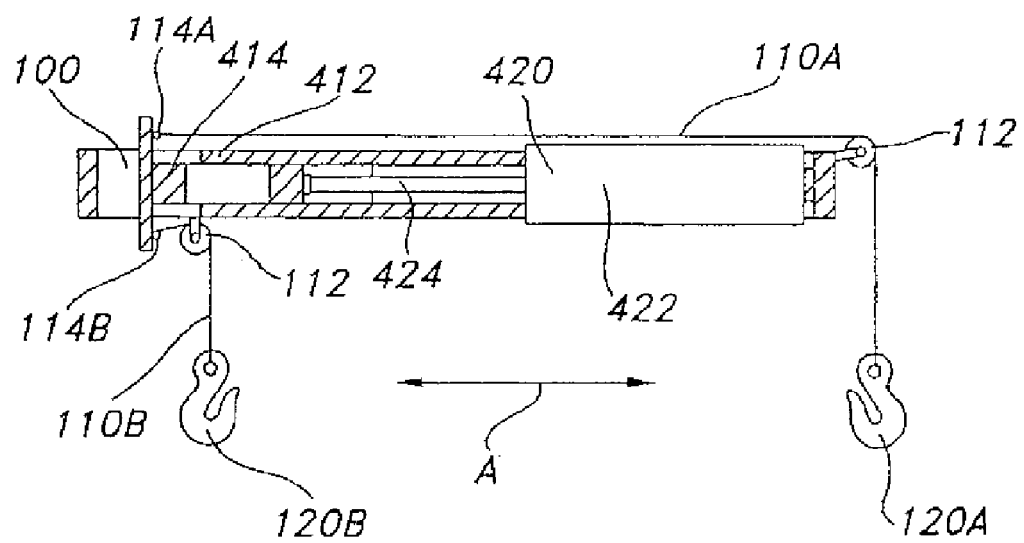
FIG. 4 is side view of the hydraulic lifting means.

FIGS. 3 and 4 illustrate a first embodiment of the lifting means 110 and the piston-and-cylinder unit 420. In this embodiment, the lifting means 110 is a cable with a hook as an attachment means 120. The piston-and-cylinder unit 420 is mounted in an auxiliary frame 410, which-is attached to the vehicle frame 100. In the embodiment shown, a bracket or track 412 is fixedly and rigidly attached to the vehicle frame 100 and the auxiliary frame 410 mounted therein. A first piston end is fixedly attached to a sliding bracket 414 that slides along the track 412. A second piston end is captured within the cylinder 422. A first end of the lifting means 110 is securely attached to the sliding bracket 414 at point 114. In the embodiment shown, the lifting means 110 includes at least two cables 110A, 110B that are attached at points 114A and 114B, respectively. The piston 424 moves into or out of the cylinder 422 when the hydraulic lift system 400 is actuated. This causes the sliding bracket 414 to translate along the track 412 as indicated by arrow A. As the sliding bracket 414 is pulled in toward the cylinder 422, the lifting means 110A and 110B are lowered or raised, depending on the direction of travel of the sliding bracket 414. A guide 112, such as a pulley wheel, may be provided to guide the lifting means 110 from a horizontal to a vertical orientation downward toward the bay. The power means 200 for driving the piston-and-cylinder unit 420 are mounted elsewhere on the vehicle frame 100. The power means 200 includes the first engine 210 for driving the hydraulic pump 220. It is well known in the field how to connect hydraulic power means to a piston-and-cylinder unit and these connections are not shown in detail herein.

The conventional ride-on trowel RT is typically provided with attachment points, such as eye bolts E or other suitable means for attaching two cables 110A and 110B with their corresponding attachment means 120A and 120B, as shown in FIGS. 1 and 2. If such attachment means are not provided, they can easily be added to the ride-on trowel RT.

Figures 5A, 5B:
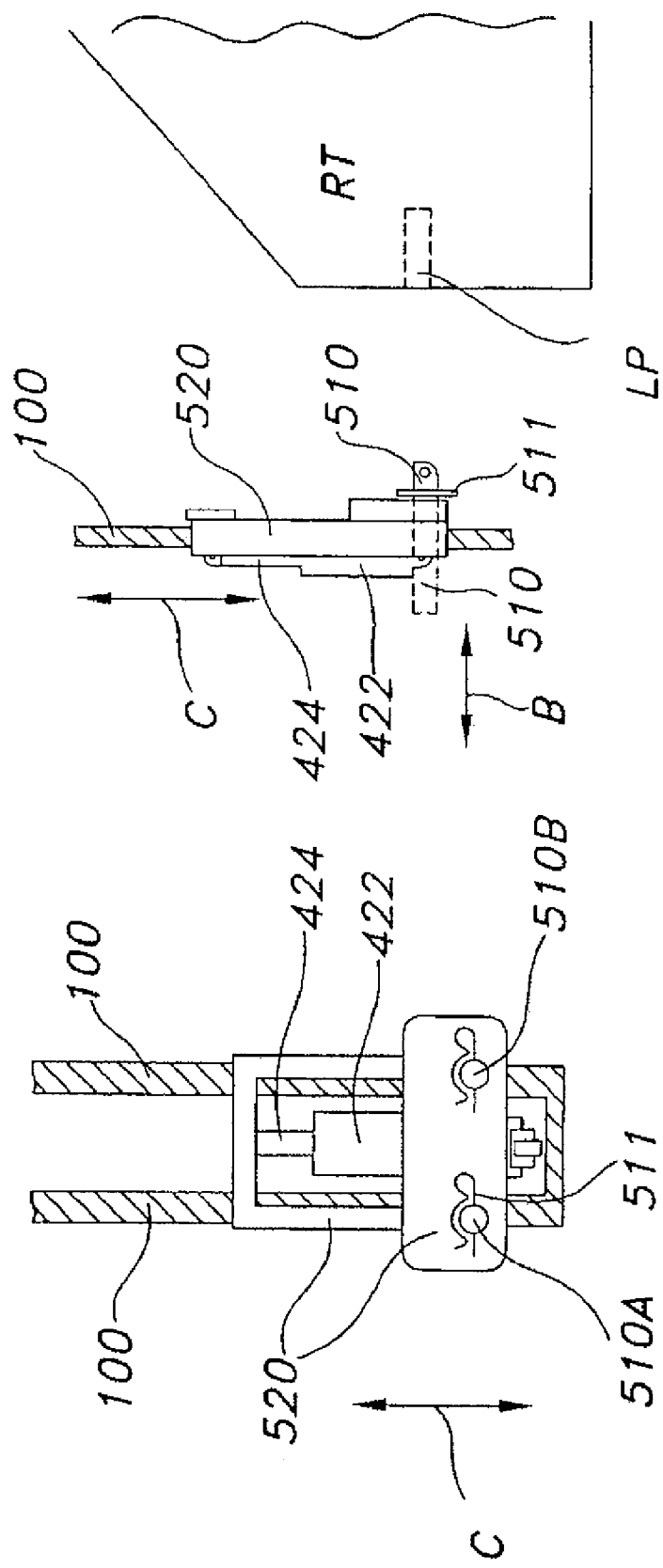
FIG. 5A is an illustration of a second embodiment of the lifting means, showing a lifting bracket and a piston-and-cylinder unit to slidably shifting the lifting bracket upward.
FIG. 5B is a side view of the lifting means of FIG. 5A, showing the lifting stud bar for insertion into a lifting point on a ride-on trowel.

FIGS. 5A and 5B illustrate a second embodiment of lifting means 510 of the trowel transporter 1000 according to the invention. The lifting means 510 includes two lifting studs 510A, 510B that are movably assembled in a lifting bracket 520. The lifting studs 510A, 510B are insertable into lifting points LP typically provided on the chassis of the ride-on trowel RT. In the embodiment shown, the lifting studs 510A, 510B are manually moved from a retracted position to a lifting position, as indicated by arrow B. The lifting bracket 520 is slidably mounted on the frame 100. The piston-and-cylinder unit 420 is also mounted on the frame 100, with the operating end of the piston 424 attached to the lifting bracket 520. The trowel transporter 1000 is maneuvered into position around the ride-on trowel RT and the lifting studs 510A, 510B inserted into the lifting points LP on the ride-on trowel. In the embodiment shown, cotter pins 511 are used to secure the lifting studs 510A, 510B and the ride-on trowel RT in position. Once the ride-on trowel RT is securely seated on the lifting studs 510A, 510B, the piston-and-cylinder unit 420 is actuated and the lifting bracket 520 moved upward, as indicated by arrow C, lifting the ride-on trowel above the ground surface.

Figure 6:
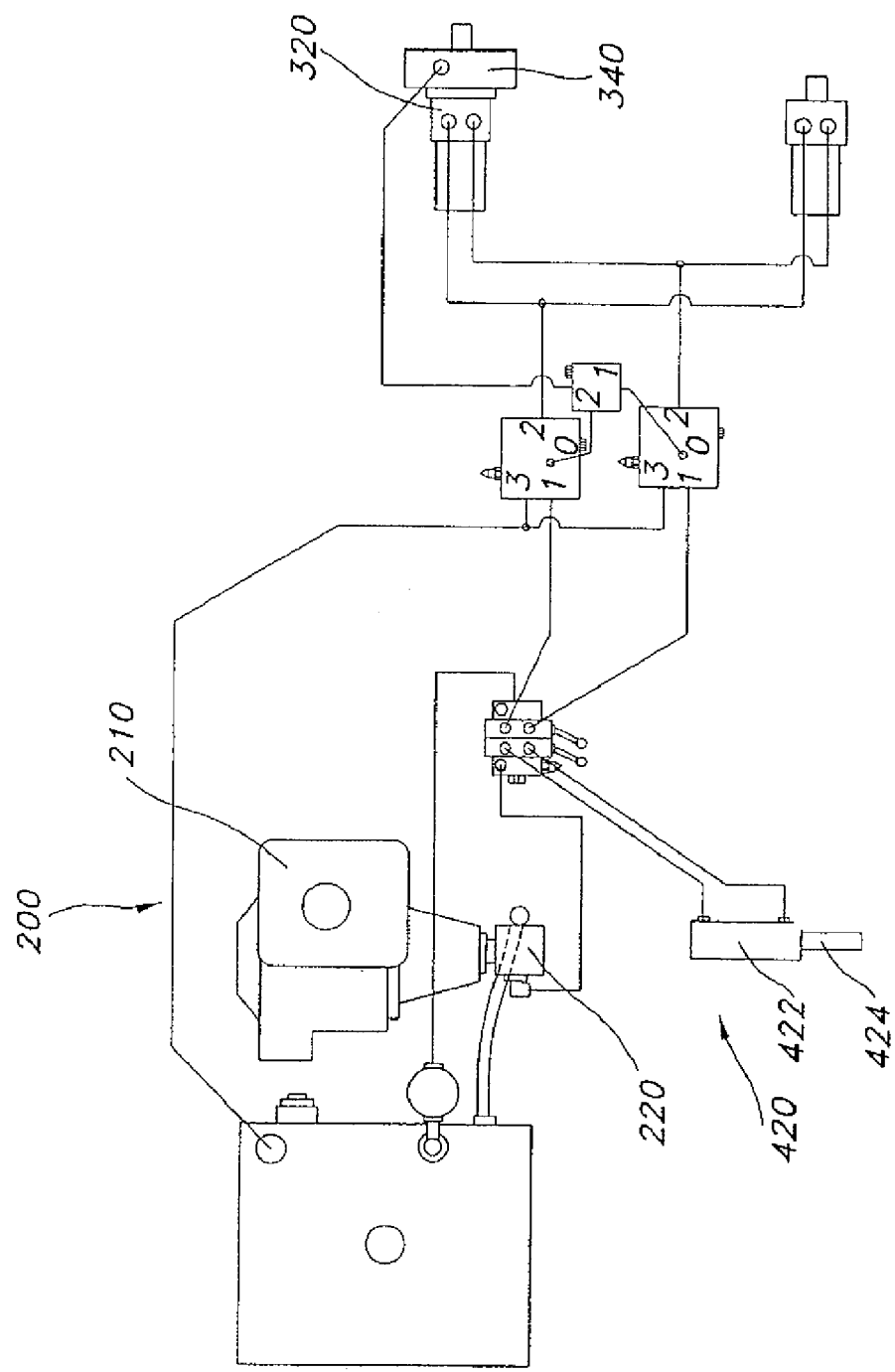
FIG. 6 is a schematic illustration of the trowel transporter according to the invention.

FIG. 6 is a schematic diagram of the systems that power the trowel transporter 1000. As shown, the hydraulic power means 200 operates the piston-and-cylinder unit 420, the drive motors 320, and the brake 340. The schematic shows two drive motors 320 and one brake 340. This is for purposes of illustration only and in no way limits the invention to the use of two driven wheels and one brake.

Turning now to FIG. 7, an alternative embodiment of a trowel transporter 700 is shown. For the sake of convenience only, the end of the trowel transporter 700 shown on the left in FIG. 7 is referred to herein as the front of the transporter, and the other end, shown on the right in FIG. 7, is referred to herein as the rear of the transporter. The trowel transporter 700 includes a vehicle frame 702, two rear wheels 704 mounted to the rear of vehicle frame 702, and a steering wheel assembly 706 mounted to the front of the vehicle frame 702. The steering wheel assembly 706 supports a front wheel 708. The trowel transporter 700 further includes a lift system 710 having two cables 712 with hooks 714 for lifting a ride-on trowel. A hydraulic system 716 is provided for powering both the lift system 710 and the wheels 704, 708. The hydraulic system 716 includes a hydraulic pump 718, an engine 720 that powers the hydraulic pump 718, a hydraulic fluid reservoir 722, and conduits, valves and controls.

Figure 9:
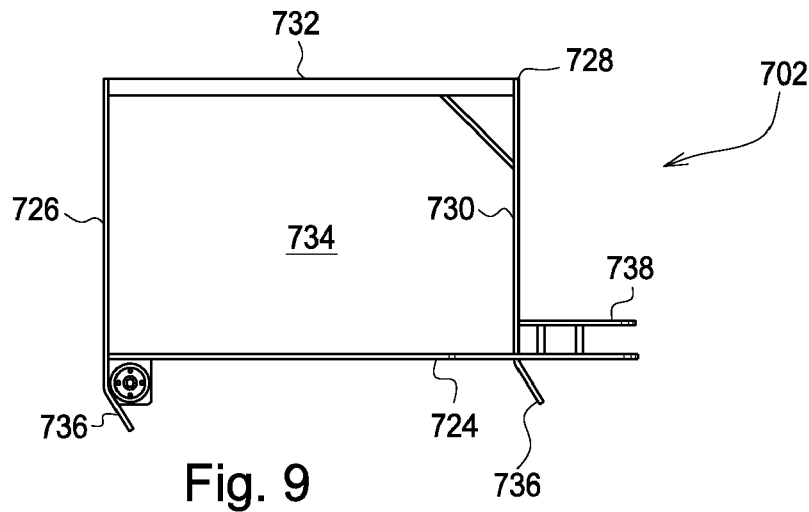
FIG. 9 is an elevation view of the vehicle frame of FIG. 8.

Referring to FIGS. 8 and 9, the vehicle frame 702 includes a lower frame 724 and a rear frame 726. Both the lower frame 724 and the rear frame 726 are generally U-shaped structures that are open at one end. The lower frame 724 and the rear frame 726 are joined together at their respective open ends and define a substantially 90-degree angle with one another. The vehicle frame 702 further includes an upper frame 728 that comprises two L-shaped members that are arranged side-by-side and slightly spaced apart. Each L-shaped member is attached at one end to the front of the lower frame 724 and at the other end to the top of the rear frame 726. More specifically, each L-shaped member has an upright leg 730 that extends substantially perpendicularly with respect to the lower frame 724 and a horizontal leg 732 that extends front-to-back along the top of the vehicle frame 702, substantially parallel to the lower frame 724. The vehicle frame 702 thus defines a partially enclosed receiving bay 734 that is open at the rear of the frame 702 so as to enable a ride-on trowel to be received therein. The bay 734 is generally sized to be large enough to receive at least one type of commercially available ride-on trowel.

The lower frame 724 surrounds the bay 734 on three sides and is configured to closely match the shape of the outer frame of a ride-on trowel (most commercial ride-on trowels have similarly shaped outer frames). That is, the width of the lower frame 724 is only slightly larger than the width of a standard ride-on trowel outer frame, and the front end of the lower frame 724 is tapered to simulate the shape of one end of a standard ride-on trowel outer frame. Accordingly, the lower frame 724 closely matches the shape of the ride-on trowel outer frame in that there is little clearance between the outer frame and the lower frame when a ride-on trowel is placed in the receiving bay 734.

In the illustrated embodiment, the lower frame 724 comprises five straight segments: a front segment 724a, two side segments 724b arranged perpendicularly to the front segment 724a, and two slanted segments 724c that connect the front segment 724a to the side segments 724b. In other words, one of the slanted segments 724c extends from a first end of the front segment 724a to a first end of one of the side segments 724b, and the other slanted segment 724c extends from a second end of the front segment 724a to a first end of the other side segment 724b. The slanted segments 724c are slanted in the sense that they define an oblique (i.e., neither perpendicular nor parallel) angle with the front and side segments. This angle is preferably, but not necessarily, around 45 degrees. The lower frame 724 is thus open at the rear and has a tapered front end. The width of the lower frame (i.e., the distance between the parallel side segments 724b) is only slightly larger than the width of a standard ride-on trowel outer frame. Generally, the width will be no greater than 73 inches, and preferably can be in the range of about 39-65 inches. With of this configuration of the lower frame 724, a ride-on trowel suspended from the vehicle frame 702 will not be able to swing or sway in the receiving bay 734. Thus, there is no need to use straps or other means to prevent the ride-on trowel from swinging. As an alternative to the angled segments, the front end of the lower frame could be curved to provide a tapered configuration. Furthermore, the trowel transporter 700 can be sized so as to fit inside an enclosed car hauler or trailer.

The vehicle frame 702 further includes a number of guides 736 extending downward from the lower frame 724. The guides 736, which are elongated members located near to where the wheels are mounted to the frame 702, function to keep a ride-on trowel centered with respect to the vehicle frame 702 when the trowel is being lifted. This prevents the trowel from getting caught on the lower frame 724 and potentially being damaged. The guides 736 are bent toward the front of the frame 702 so as to provide better ground clearance when the trowel transporter is being moved up or down a ramp.

Figure 10:
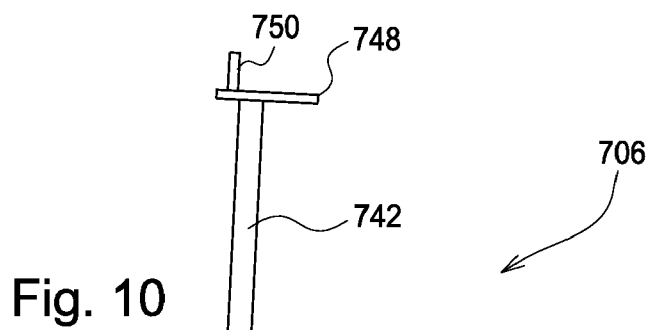
FIG. 10 is an elevation view of a portion of a steering wheel assembly.

A mounting platform 738 is attached to the front of vehicle frame 702 for supporting the hydraulic pump 718 and the engine 720. The hydraulic fluid reservoir 722 is mounted to the upright legs 730 of the upper frame 728. The mounting platform 738 also supports the steering wheel assembly 706. As shown in FIG. 10, the steering wheel assembly 706 comprises a base 740 and a curved steering arm 742 extending outward and upward from one side of the base 740. An axle 744 extends upward from the center of the base 740 and is received in a hole 746 formed in the mounting platform 738. The axle 744 is free to rotate about its longitudinal axis but is axially retained in the hole 746. Thus, the entire steering wheel assembly 706 can be rotated relative to the mounting platform 738. A plate 748 supporting two handles 750 is mounted to the outer end of the steering arm 742 to allow a user to move and control the steering wheel assembly 706.

Figure 11:
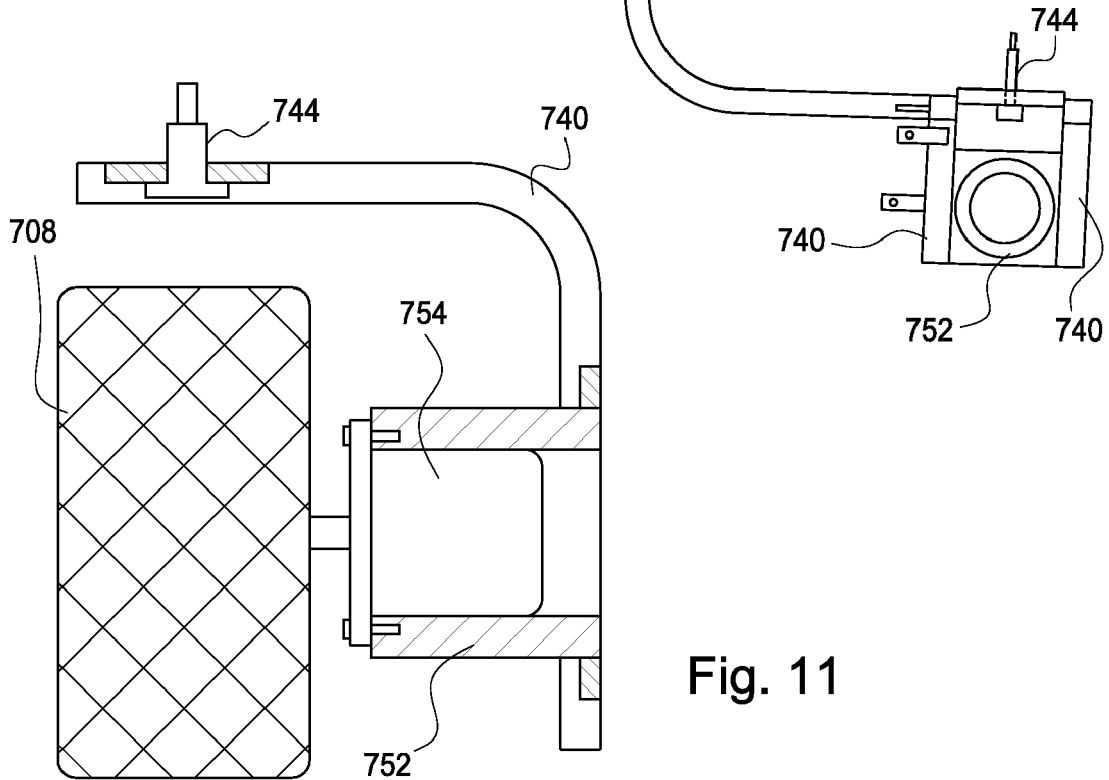
FIG. 11 is a partial cross-sectional view of the steering wheel assembly.

The base 740 further includes a cylindrical mounting sleeve 752. As best seen in FIG. 11, a hydraulic drive motor 754 is securely disposed inside the mounting sleeve 752 and the front wheel 708 is connected to the drive motor 754. The drive motor 754 is powered by the hydraulic system 716 to rotate the front wheel 708 in either direction. The vehicle frame 702 also includes a mounting sleeve 752 in each of the two rear corners. Each of these mounting sleeves 752 similarly contains a hydraulic drive motor 754 powered by the hydraulic system 716 to drive a respective one of the rear wheels 704. The trowel transporter of this embodiment thus has all-wheel drive. The trowel transporter 700 can include a hydraulic brake (not shown), similar to the brake described above in connection with the first embodiment. A mechanical brake associated with the front wheel 708 could alternatively be used.

Figure 12:
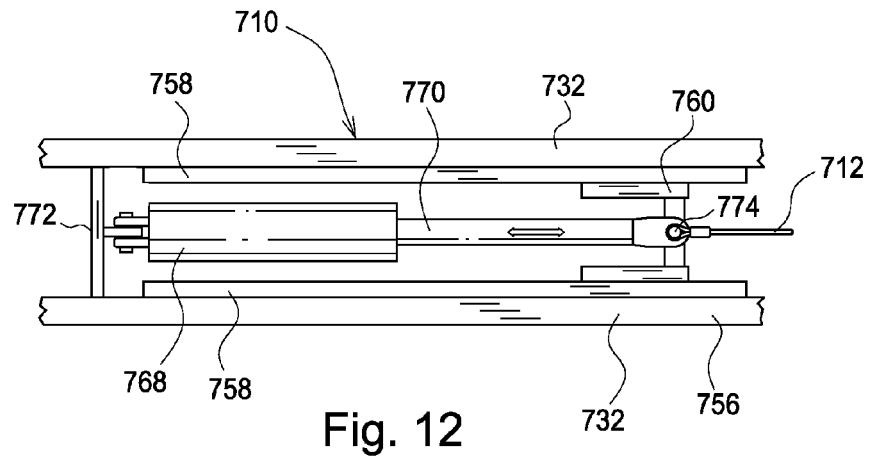
FIG. 12 is a top view of a portion of a lift system.
Figure 13:
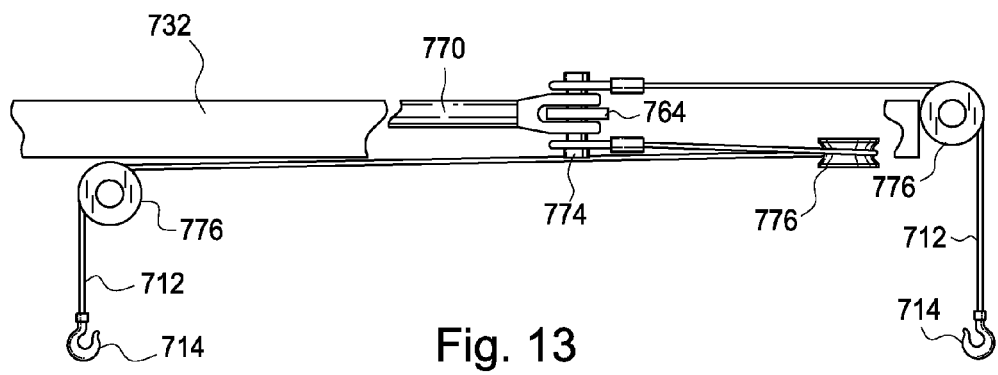
FIG. 13 is a partially cut-away side view of the lift system of FIG. 12.
Figure 14:
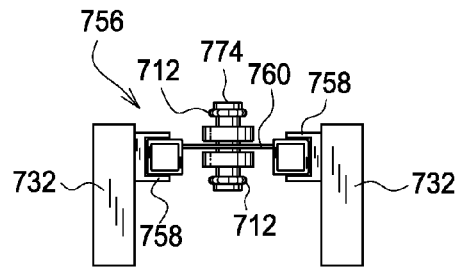
FIG. 14 is an end view of the lift system of FIG. 12.
Figure 15:
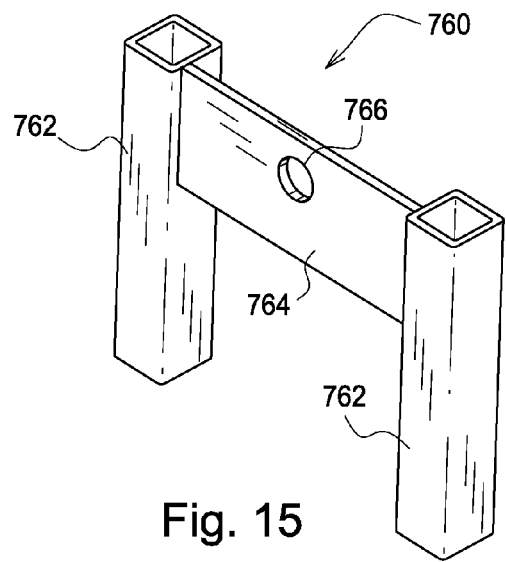
FIG. 15 is perspective view of a slider from the lift system of FIG. 12.

FIGS. 12-14 show a portion of the lift system 710 in more detail. In this embodiment, a slide assembly 756 is mounted between the horizontal legs 732 of the upper frame 728 above the receiving bay 734. The slide assembly 756 includes a pair of channel guides 758, one attached to the inside surface of each horizontal leg 732 and a slider 760 slidingly received in the channel guides 758 so as to slide back-and-forth parallel to the horizontal legs 732. As seen in FIG. 15, the slider 760 has two parallel rails 762 that are received in the corresponding channel guide 758 and a connector plate 764 that extends between the two rails 762. The connector plate 764 has a hole 766 formed therein. The slide assembly 756 further includes a hydraulic cylinder 768 having a piston rod 770. One end of the hydraulic cylinder 768 is connected (such as with a clevis fastening arrangement) to the vehicle frame 702 via a flange 772 extending between the horizontal legs 732, and the outer end of the piston rod 770 is connected to the slider 760 by means of a pin 774 extending through the piston rod 770 and the hole 766.

As best seen in FIG. 13, the pin 774 is sufficiently long enough to extend well above and below the connector plate 764. The ends of the two cables 712 opposite the hooks 714 are formed into loops that are attached to protruding ends of the pin 774. Each cable 712 is guided over one or two pulleys 776 that are supported by the vehicle frame 702 in any suitable manner. The pulleys 776 guide the cables 712 and redirect them in a vertical direction. When the hydraulic cylinder 768—powered by the hydraulic system 716—causes the piston rod 770 to move in or out, the cables 712 are correspondingly raised or lowered. The manner in which the cables 712 are attached to the pin 774 facilitates replacement of the cables 712 in the event a different length of cable is needed for a particular application. The positioning of the pulleys 776 and the relative lengths of the two cables 712 are such that the two hooks 714 are always at the same level.

In use, the trowel transporter 700 is positioned over a ride-on trowel so that the trowel is situated in the receiving bay 734. The hydraulic system 716 is operated to lower the cables 712, which are then connected to the ride-on trowel using the hooks 714. (As mentioned above, the hooks could be replaced with lifting pins or studs that are insertable into lifting points provided on the ride-on trowel for attaching the cables to the ride-on trowel.) The hydraulic system 716 is then operated to raise the cables 712, which raises the trowel. The hydraulic system 716 can then be operated to drive the wheels 704, 708 and move the trowel transporter 700 and the trowel to the desired location. In this way, the trowel can be moved easily around a work site. Furthermore, the trowel transporter 700 and the trowel can be loaded onto a trailer, such as an enclosed car hauler, so that the trowel transporter 700 and the trowel can be transported to another work site. A cable and ratchet device (not shown) can be optionally used to prevent the rear frame 726 from spreading, particularly when transporting particularly heavy trowels. This would comprise attaching a cable to each side of the rear frame 726 and using a ratchet device to pull the cable tight. The ratchet device could be a commercial, off-the-shelf item such as a come along or power puller.

While specific embodiments of the present invention have been described, it should be noted that various modifications thereto can be made without departing from the spirit and scope of the invention as defined in the appended claims.

What is claimed is:

1. A vehicle for transporting a ride-on trowel having an outer frame defining a shape, said vehicle comprising:
   a vehicle frame defining a bay that is sized and shaped to receive said ride-on trowel, said vehicle frame including a lower frame that surrounds said bay on three sides, a rear frame that is a generally U-shaped structure open at one end, and an L-shaped upper frame connected at one end to said lower frame and connected at another end to said rear frame;
   wherein said lower frame has an open rear end and a tapered front end and is configured to closely match said shape of said ride-on trowel outer frame;
   wherein said lower frame includes a plurality of guides extending downward therefrom, said guides comprising elongated members that are located so as to limit motion of said ride-on trowel in both left-right and fore-aft directions with respect to said vehicle frame while being lifted or lowered, wherein said guides are bent toward the front of said vehicle frame;
   wherein said lower frame and said rear frame are joined together at their respective open ends and define a substantially 90-degree angle with one another;
   means for driving said vehicle; and
   means for supporting said ride-on trowel from said vehicle frame.

2. The vehicle of claim 1 wherein said means for supporting comprises:
   a slider slidingly mounted to said vehicle frame above said bay;
   a hydraulic cylinder unit arranged to move said slider relative to said vehicle frame; and
   a cable having a first end attached to said slider and a second end supporting means for attaching said cable to said ride-on trowel.

3. The vehicle of claim 2 wherein said means for attaching said cable to said ride-on trowel comprises a hook.

4. The vehicle of claim 2 wherein said means for supporting further comprises a second cable having a first end attached to said slider and a second end supporting means for attaching said second cable to said ride-on trowel.

5. The vehicle of claim 2 further comprising a hydraulic pump that actuates said hydraulic cylinder unit and means for powering said hydraulic pump.

6. The vehicle of claim 5 wherein said means for powering said hydraulic pump is a combustion engine.

7. The vehicle of claim 1 further comprising first and second rear wheels mounted to said rear end of said lower frame and a front wheel mounted to said front end of said lower frame.

8. The vehicle of claim 7 wherein said means for driving said vehicle includes a first hydraulic drive motor associated with said first rear wheel, a second hydraulic drive motor associated with said second rear wheel, and a third hydraulic drive motor associated with said front wheel.

9. The vehicle of claim 8 wherein said means for driving said vehicle further includes a hydraulic pump for actuating said hydraulic drive motors and means for powering said hydraulic pump.

10. The vehicle of claim 9 wherein said means for powering said hydraulic pump is a combustion engine.

11. The vehicle of claim 1 further comprising a steering wheel assembly, wherein said steering wheel assembly comprises:
   a base rotatively mounted to said vehicle frame;
   a steering arm extending outwardly from said base; and
   a wheel mounted to said base.

12. The vehicle of claim 11 further comprising a hydraulic drive motor mounted to said base and connected to said wheel.

13. A vehicle for transporting a ride-on trowel having an outer frame defining a shape, said vehicle comprising:
   a vehicle frame defining a bay that is sized and shaped to receive said ride-on trowel, said vehicle frame including a lower frame that surrounds said bay on three sides, a rear frame that is a generally U-shaped structure open at one end, and an L-shaped upper frame connected at one end to said lower frame and connected at another end to said rear frame;
   wherein said lower frame has an open rear end and a tapered front end and is configured to closely match said racetrack shape of said ride-on trowel outer frame, and wherein said lower frame is sized with respect to said ride-on trowel so that said ride-on trowel will not swing or sway in said bay when supported from said vehicle frame;
   wherein said lower frame comprises:
   a straight front segment;
   straight first and second side segments arranged perpendicularly to said front segment; and straight first and second slanted segments, wherein said first slanted segment extends from a first end of said front segment to a first end of said first side segment and said second slanted segment extends from a second end of said front segment to a first end of said second side segment, such that said first and second slanted segments both extend at acute angles to said front segment
   wherein said lower frame and said rear frame are joined together at their respective open ends and define a substantially 90-degree angle with one another;
   wherein said lower frame includes a plurality of guides extending downward therefrom, said guides comprising elongated members that are located so as to limit motion of said ride-on trowel in both left-right and fore-aft directions with respect to said vehicle frame while being lifted or lowered, wherein said guides are bent toward the front of said vehicle frame;
   means for driving said vehicle; and
   means for supporting said ride-on trowel from said vehicle frame.

14. The vehicle of claim 13 wherein the distance between said first and second side segments is no greater than 73 inches.

* * * * *